US008178630B2

(12) United States Patent
Koschabek et al.

(10) Patent No.: US 8,178,630 B2
(45) Date of Patent: May 15, 2012

(54) INORGANICALLY MODIFIED POLYESTER BINDER PREPARATION, PROCESS FOR PRODUCTION AND USE THEREOF

(75) Inventors: Rene Koschabek, Mannheim (DE); Martin Bartmann, Recklinghausen (DE); Thorsten Brand, Marl (DE); Burkhard Standke, Loerrach (DE); Roland Edelmann, Rheinfelden (DE); Christian Wassmer, Hausen (DE)

(73) Assignee: Evonik Degussa GmbH, Essen (DE)

( * ) Notice: Subject to any disclaimer, the term of this patent is extended or adjusted under 35 U.S.C. 154(b) by 97 days.

(21) Appl. No.: 12/673,289

(22) PCT Filed: Jul. 8, 2008

(86) PCT No.: PCT/EP2008/058823
§ 371 (c)(1),
(2), (4) Date: Feb. 12, 2010

(87) PCT Pub. No.: WO2009/021779
PCT Pub. Date: Feb. 19, 2009

(65) Prior Publication Data
US 2011/0178238 A1 Jul. 21, 2011

(30) Foreign Application Priority Data
Aug. 14, 2007 (DE) .................. 10 2007 038 313

(51) Int. Cl.
C09D 167/02 (2006.01)
C08G 63/91 (2006.01)
C08K 5/5435 (2006.01)

(52) U.S. Cl. ....................... 525/446; 524/604
(58) Field of Classification Search ........................ None
See application file for complete search history.

(56) References Cited

U.S. PATENT DOCUMENTS

| | | | |
|---|---|---|---|
| 2,517,945 A * | 8/1950 | Upson ................................ 528/8 |
| 3,032,439 A * | 5/1962 | Muller et al. .................. 428/429 |
| 3,317,369 A * | 5/1967 | Clark et al. .................... 442/266 |
| 3,519,670 A * | 7/1970 | Markovitz .................... 556/402 |
| 4,242,487 A * | 12/1980 | Yajima et al. .................. 528/25 |
| 4,386,151 A * | 5/1983 | Berger et al. ................. 430/228 |
| 4,604,248 A * | 8/1986 | Dehm ........................... 264/3.1 |
| 5,306,856 A | 4/1994 | Streck et al. |
| 5,591,818 A | 1/1997 | Standke et al. |
| 5,668,237 A * | 9/1997 | Popall et al. ..................... 528/9 |
| 5,734,000 A * | 3/1998 | Popall et al. .................... 528/32 |
| 5,744,675 A | 4/1998 | Fiolitakis et al. |
| 5,885,341 A | 3/1999 | Standke et al. |
| 5,885,591 A * | 3/1999 | Ahmad et al. ................. 424/400 |
| 5,902,847 A * | 5/1999 | Yanagi et al. .................. 524/300 |
| 5,932,757 A | 8/1999 | Standke et al. |
| 6,069,259 A * | 5/2000 | Crivello ........................ 549/214 |
| 6,133,466 A | 10/2000 | Edelmann et al. |
| 6,140,419 A | 10/2000 | Barglik-Chory et al. |
| 6,239,194 B1 | 5/2001 | Standke et al. |
| 6,361,871 B1 | 3/2002 | Jenkner et al. |
| 6,395,858 B1 | 5/2002 | Mack et al. |
| 6,403,228 B1 | 6/2002 | Mack et al. |
| 6,432,191 B2 * | 8/2002 | Schutt ....................... 106/287.13 |
| 6,451,382 B2 * | 9/2002 | Schutt et al. .................. 427/387 |
| 6,495,264 B2 * | 12/2002 | Hayashi et al. ................ 428/447 |
| 6,500,883 B1 | 12/2002 | Mack et al. |
| 6,528,585 B1 | 3/2003 | Standke et al. |
| 6,689,468 B2 | 2/2004 | Edelmann et al. |
| 6,695,904 B2 | 2/2004 | Burger et al. |
| 6,699,586 B2 | 3/2004 | Edelmann et al. |
| 6,716,952 B1 * | 4/2004 | Matsumoto et al. ............. 528/10 |
| 6,830,816 B2 | 12/2004 | Mehnert et al. |
| 6,841,197 B2 | 1/2005 | Standke et al. |
| 6,864,323 B2 | 3/2005 | Schlosser et al. |
| 6,946,537 B2 | 9/2005 | Krafczyk et al. |
| 7,026,398 B2 | 4/2006 | Monkiewicz et al. |
| 7,423,165 B2 | 9/2008 | Korth et al. |
| 7,625,975 B2 | 12/2009 | Barfurth et al. |
| 7,709,597 B2 * | 5/2010 | Tamura ....................... 528/394 |
| 7,781,520 B2 | 8/2010 | Standke et al. |
| 7,825,074 B2 * | 11/2010 | Schmidt et al. ............... 507/234 |
| 2002/0098243 A1 | 7/2002 | Edelmann et al. |
| 2002/0102417 A1 * | 8/2002 | Schutt et al. .................. 428/447 |
| 2002/0127415 A1 | 9/2002 | Standke et al. |
| 2003/0018155 A1 | 1/2003 | Krafczyk et al. |
| 2003/0134969 A1 | 7/2003 | Schlosser et al. |
| 2005/0191505 A1 * | 9/2005 | Akarsu et al. .................. 428/469 |
| 2005/0279140 A1 * | 12/2005 | Adzima et al. .................. 65/453 |
| 2006/0063002 A1 | 3/2006 | Edelmann et al. |
| 2006/0225612 A1 * | 10/2006 | Lejeune et al. .......... 106/287.13 |
| 2006/0225613 A1 * | 10/2006 | Lejeune et al. .......... 106/287.16 |
| 2007/0099004 A1 | 5/2007 | Edelmann et al. |
| 2007/0114491 A1 * | 5/2007 | Shi et al. .................. 252/299.01 |

(Continued)

FOREIGN PATENT DOCUMENTS
WO    02 100151    12/2002

OTHER PUBLICATIONS

U.S. Appl. No. 08/124,955, filed Sep. 21, 1993, Standke, et al.
U.S. Appl. No. 10/112,045, filed Apr. 1, 2002, Mehnert, et al.
U.S. Appl. No. 12/673,289, filed Feb. 12, 2010, Koschabek, et al.
U.S. Appl. No. 12/992,684, filed Mar. 4, 2011, Nowak, et al.
U.S. Appl. No. 13/058,290, filed Feb. 9, 2011, Weissenbach, et al.
U.S. Appl. No. 13/059,546, filed Feb. 17, 2011, Weissenbach, et al.
U.S. Appl. No. 13/062,225, filed Mar. 4, 2011, Weissenbach, et al.

(Continued)

Primary Examiner — Robert Loewe
(74) Attorney, Agent, or Firm — Oblon, Spivak, McClelland, Maier & Neustadt, L.L.P.

(57) ABSTRACT

The present invention relates to a preparation comprising at least one specific oligomeric siloxane component and at least one polymer component, to processes for producing it and to its use in formulations, more particularly metal coating formulations.

14 Claims, No Drawings

U.S. PATENT DOCUMENTS

| | | |
|---|---|---|
| 2008/0027161 A1 | 1/2008 | Schlosser et al. |
| 2008/0187673 A1 | 8/2008 | Standke et al. |
| 2008/0200577 A1 | 8/2008 | Spyrou et al. |
| 2009/0005518 A1 | 1/2009 | Just et al. |
| 2009/0007818 A1 | 1/2009 | Militz et al. |
| 2009/0030162 A1 | 1/2009 | Mueh et al. |
| 2009/0250218 A1* | 10/2009 | Akarsu et al. ............ 166/292 |
| 2010/0016543 A1 | 1/2010 | Brenner et al. |
| 2010/0028697 A1 | 2/2010 | Koschabek et al. |
| 2010/0056662 A1 | 3/2010 | Spyrou et al. |
| 2010/0119851 A1 | 5/2010 | Giessler-Blank et al. |
| 2010/0191001 A1* | 7/2010 | Wassmer et al. ............ 549/215 |
| 2010/0209719 A1 | 8/2010 | Borup et al. |
| 2011/0034584 A1 | 2/2011 | Albert et al. |
| 2011/0045723 A1 | 2/2011 | Nowak et al. |
| 2011/0071256 A1 | 3/2011 | Nowak et al. |

OTHER PUBLICATIONS

U.S. Appl. No. 61/093,219, filed Aug. 29, 2008, Simoes.
U.S. Appl. No. 13/061,451, filed Feb. 28, 2011, Weissenbach, et al.
U.S. Appl. No. 13/011,115, filed Jan. 21, 2011, Ruf, et al.
U.S. Appl. No. 12/673,390, filed Feb. 16, 2010, Wassmer, et al.
U.S. Appl. No. 12/161,112, filed Jul. 16, 2008, Standke, et al.
U.S. Appl. No. 12/675,057, filed Feb. 24, 2010, Spyrou, et al.
U.S. Appl. No. 12/520,873, filed Jun. 23, 2009, Spyrou, et al.
U.S. Appl. No. 12/933,028, filed Sep. 16, 2010, Spyrou.

* cited by examiner

INORGANICALLY MODIFIED POLYESTER BINDER PREPARATION, PROCESS FOR PRODUCTION AND USE THEREOF

The present invention relates to a preparation comprising at least one specific oligomeric siloxane component and at least one polymer component, to processes for producing it and to its use in formulations, more particularly metal coating formulations.

Coil coatings are continuous coatings on cold-roll, usually galvanized strips of steel or of aluminium. Under constant and reproducible conditions, painted metal strips are produced which can be used in industry as materials with an already coated surface. These materials find application, for example, in

- construction (architectural facing elements, acoustic insulation walls, blinds, roof tiles)
- transport (recreational vehicles, freight containers, road signs, lorry bodies)
- household appliances (washing machines, refrigerators, ovens)
- metal packaging (cans, tubes).

Important properties for coatings of this kind are resistance to weather, hydrolysis, chemicals and scratching, high gloss, corrosion control, hardness and flexibility, and also a high level of substrate adhesion. The latter two properties are inherently important for metal coatings, since after the coating operation the metal substrates are subjected to one or more shaping steps, as is necessary for numerous components.

Used preferentially in the metal coating industry are organic, polyester-based binders (*ECCA Statistics* 2004) which are crosslinked by means of fully alkylated, partly alkylated or unalkylated melamine compounds and their derivatives, benzoguanamines or ureas, or less preferably by blocked polyisocyanates. These familiar coatings are notable in particular for high flexibility. Disadvantages of these coatings are in respect, in particular, of substrate adhesion, chemical resistance and scratch resistance.

It is known, moreover, that purely inorganic, siloxane-based coating systems, prepared by reacting hydrolysable silane groups with water or water donors, are distinguished by high scratch resistance and chemical resistance.

A widely known process for producing purely inorganic coatings of this kind is the sol-gel process, as described comprehensively by C. J. Brinker and G. W. Scherer in *Sol-Gel Science: The Physics and Chemistry of Sol-Gel Processing*, Academic Press, New York (1990).

Predominantly inorganic sol-gel coatings of this kind are too brittle for many metal coatings, and have a tendency, when the metal sheets are subjected to three-dimensional shaping, to undergo stress cracks. As well as the aesthetic defects associated with this, moisture may penetrate through such cracks beneath the coating, and then trigger corrosive processes on the metal sheet.

Combinations of inorganic and organic binders, known as hybrid coating materials, are prior art. EP 1006131, for example, describes a preparation for heavy-duty coatings, as in the automotive sector, for example, that is based on adducts of aliphatic polyisocyanates and aminosilanes.

EP 1310534 describes a preparation using monomeric silanes which as additives are added, alone or together with epoxy adducts of phosphoric acid, to the coating formulation.

It was an object of the invention to provide a preparation which when employed in corresponding formulations, more particularly in metal coatings, exhibits improved substrate adhesion and at the same time is flexible.

Surprisingly it has now been found that a preparation according to the invention offers an improved balance between high hardness, substrate adhesion and flexibility and in terms of flexibility is in fact better than purely organic polyester metal coatings.

The present invention accordingly provides a preparation at least comprising at least one oligomeric siloxane component and at least one polymer component, characterized in that the oligomeric siloxane component is obtainable by controlled hydrolysis and condensation of at least one epoxy-functional silane of the general formula I

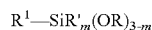  (I)

in which $R^1$ is a group

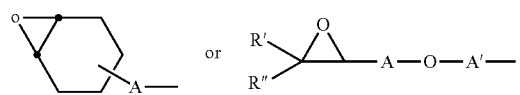

and the groups R, R' and R" are alike or different and are each a hydrogen (H) or a linear, branched or cyclic, optionally substituted alkyl group having 1 to 6C atoms, preferably H, methyl, ethyl, n-propyl, n-butyl, the groups A and A' are alike or different and are each a divalent alkyl group having 1 to 10C atoms, preferably —(CH$_2$)$_2$—, —(CH$_2$)$_2$—, —(CH$_2$)$_3$—, —(CH$_2$)(CH)(CH$_3$)(CH$_2$)— for A' and also —(CH$_2$)— for A and m is 0 or 1, in the presence of boric acid [H$_3$BO$_3$ or B(OH)$_3$].

Typically when preparing sol-gel systems the water is usually used in excess. The aim of this is to achieve as far as possible complete hydrolysis. Unfortunately, under these conditions, many silanes do not undergo complete hydrolysis. For example, in the hydrolysis of 3-glycidyloxypropylt-rimethoxysilane, even with a high concentration of acidic catalysts, such as HCl or acetic acid, even after hours and even after hydrolysis at elevated temperature, there remains a monomer fraction of approximately 90% (area per cent GC TCD). For this purpose, in a parallel application, a new method has been provided that allows epoxy-functional silanes, more particularly 3-glycidyloxypropyl-alkoxysilanes per se or corresponding mixtures of organoalkoxysilanes containing 3-glycidyloxypropyl-alkoxysilane, to be hydrolysed, and at least proportionately condensed, with a substoichiometric amount of water, reliably and as far as possible completely, using boric acid.

In the course of the thermal curing of the coating, the siloxane oligomer that is used co-crosslinks with, for example, an organic polyester polyol and is able through further functional groups to contribute to improved substrate adhesion.

The siloxane oligomers are prepared by controlled hydrolysis and condensation of at least one epoxy-functional silane of the general formula I

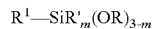  (I)

in which $R^1$ is a group

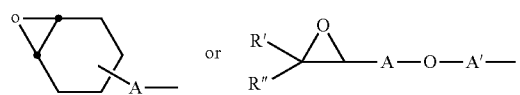

and the groups R, R' and R" are alike or different and are each a hydrogen (H) or a linear, branched or cyclic, optionally substituted alkyl group having 1 to 6C atoms, preferably H, methyl, ethyl, n-propyl, n-butyl, groups A and A' are alike or different and are each a divalent alkyl group having 1 to 10C atoms, preferably —(CH$_2$)$_2$—, —(CH$_2$)$_2$—, —(CH$_2$)$_3$—, —(CH$_2$)(CH)(CH$_3$)(CH$_2$)— for A' and also —(CH$_2$)— for A and m is 0 or 1, in the presence of boric acid.

Present additionally during the hydrolysis and condensation there may be at least one further organo-functional silane of the general formula II

$$R^2\text{—SiR}'_n(OR)_{3-n} \qquad (II)$$

in which R$^2$ is a linear, branched or cyclic, optionally substituted alkyl group having 1 to 20C atoms, substituted for example by N-, O-, S-, halogen-bearing groups, such as fluoroalkyl, aminoalkyl, mercaptoalkyl, methacryloyloxyalkyl or OR, i.e. OH or alkoxy, more particularly methoxy or ethoxy, in which R' is methyl, groups R independently are a hydrogen or a linear, branched or cyclic alkyl group having 1 to 6C atoms, and n is 0 or 1. According to formula II it is possible advantageously in the process of the invention to use methoxy- or ethoxysilanes, which more particularly carry a functional group R$^2$ from the series methoxy, ethoxy, methyl, ethyl, n-propyl, isopropyl, n-butyl, n-octyl, isooctyl, tridecafluoro-1,1,2,2-tetrahydrooctyl, to name but a few examples, such as, for example—but not exclusively—methyltrimethoxysilane, methyltriethoxysilane, vinyltrimethoxysilane, vinyltriethoxysilane, n-propyltrimethoxysilane, n-propyltriethoxysilane, n-octyltrimethoxysilane, n-octyltriethoxysilane, hexa-decyltrimethoxysilane, hexadecyltriethoxysilane, tri-decafluoro-1,1,2,2-tetrahydrooctyltrimethoxysilane, tridecafluoro-1,1,2,2-tetrahydrooctyltriethoxysilane, methacryloyloxypropyltrimethoxysilane, methacryloyloxypropyltriethoxysilane, mercaptopropyltrimethoxysilane, mercapto-propyltriethoxysilane, tetramethoxysilane, tetraethoxy-silane.

In the preparation of the siloxane component 0.001 to ≦5 mol of water are used per mole of alkoxy function of the silanes employed, no further hydrolysis and condensation catalyst besides boric acid as hydrolysis catalyst and condensation component is used, and the condensates formed in the reaction are based on Si—O—B and/or Si—O—Si bonds.

In the reaction according to the invention it is preferred to use 0.05 to 5, more preferably 0.1 to 2, very preferably 0.15 to 1, more particularly all numerical values between 0.15 and 1 mol, such as, for example, but not exclusively, 0.2, 0.3, 0.4, 0.5, 0.6, 0.7, 0.8, 0.9, of water per mole of alkoxy function employed as per formula I and/or II.

Furthermore, in the process according to the invention, it is preferred to use 0.001 to 1 mol of boron, with particular preference 0.01 to 0.5, more particularly 0.07 to 0.76 mol of boron, which advantageously is introduced in the form of boric acid [H$_3$BO$_3$ or B(OH)$_3$], per mole of silane employed.

Additionally, in the process according to the invention, the reaction is carried out advantageously at a temperature in the range from 0 to 200° C., preferably at 40 to 150° C., more preferably from 50 to 100° C., very preferably 60 to 80° C.

Accordingly the reaction according to the invention is carried out more particularly with thorough mixing over 0.1 to 100 h, preferably 0.5 to 20 h, more preferably 1 to 10 h, very preferably over 2 to 6 h.

It is likewise possible in the case of the process stated, advantageously, to remove from the resultant product mixture at least a proportion of the alcohol and/or boric ester it contains, in a conventional distillation under reduced pressure. Such constituents can alternatively be removed from the product by means of short-path evaporators and/or thin-film evaporators.

Furthermore, products obtained in this way can—if necessary—be filtered or centrifuged in order to separate off suspended particles. This can be done using, for example, a filter or a centrifuge.

With more particular preference the glycidyl-propylalkoxysilane of the general formula I is glycidyloxypropyltrimethoxy- or -ethoxysilane.

For example it is possible advantageously to carry out a virtually complete hydrolysis of 3-glycidyloxy-propyltrimethoxysilane (GLYMO) with an amount of water of 0.05 to 5, preferably 0.1 to 2, more particularly 0.15 to 1 mol of water per mole of alkoxy function employed, with the use or in the presence of boric acid. More particularly it is possible over the course of just 7 hours to react as good as all of the GLYMO to oligomeric products by means of boric acid catalysis. A virtually complete hydrolysis in this context means that less than 20% by weight or area % (GC-TCD %) of the monomeric silane originally employed remains unhydrolysed in the reaction space after the hydrolysis has been performed. The oligomers obtained in this way are stable on storage for at least three months and may be used advantageously, for example, for binder preparation with polyester polyols.

Reaction checking (determining the concentration of monomeric silanes in the reaction mixture) is accomplished preferably by way of standard gas chromatography (HP 5890 Series II, thermal conductivity detector). Temperature measurement may be accomplished conventionally via thermocouples. Pressure measurement is accomplished, for example, by means of piezoelectric pressure transducers (e.g. Vacubrand DVR 2). The residual monomer content of the products can be checked additionally via $^{29}$Si NMR spectroscopy, and is situated advantageously in the range from 5 to 17 mol %. The degree of crosslinking of the product is ascertained by determining the M, D and T structural units via $^{29}$Si NMR spectroscopy. In the silane condensates of the invention the fraction of M structural units is preferably in the range from 14 to 35 mol %, that of D structures in the range from 36 to 42 mol %, and that of T structures in the range from 15% to 34%. The hydromethanolysis of the epoxide group can be determined via $^{13}$C NMR spectroscopy. The product compositions of the invention advantageously contain only a fraction of 3 to 7 mol % of opened epoxide, based on the epoxide fraction originally employed.

The polymer component more particularly comprises hydroxyl-containing polymers, very preferably those from the group consisting of polyesters, polycarbonate polyols or polyether polyols. More particular preference is given to the hydroxyl-containing polyesters.

The inventively preferred polyesters are prepared by known processes (see Dr P. Oldring, Resins for Surface Coatings, Volume III, published by Sita Technology, 203 Gardiner House, Broomhill Road, London SW18 4JQ, England 1987) by condensation.

Preferably the polyesters have an acid number between 0 and 10 mg KOH/g, preferably 0.1 to 5 mg KOH/g and more preferably 0.1 to 3 mg KOH/g, a hydroxyl number between 3 and 200 mg KOH/g, preferably 10 to 80 mg KOH/g and more preferably 15 to 40 mg KOH/g, a glass transition temperature (Tg) between −50° C. and 110° C., preferably between −20° C. and +70° C., very preferably between −10° C. and +60° C., a linear or branched structure, preferably linear or slightly branched, more preferably linear, and a molecular weight (M$_n$) between 800 g/mol and 25 000 g/mol, preferably between 1300 g/mol and 11 000 g/mol and more preferably between 2000 g/mol and 7500 g/mol.

The acid number is determined in accordance with DIN EN ISO 2114.

The acid number (AN) is the amount of potassium hydroxide, in mg, which is needed to neutralize the acids present in one gram of substance. The sample under analysis is dissolved in dichloromethane and titrated with 0.1 N methanolic potassium hydroxide solution against phenolphthalein.

The hydroxyl number is determined in accordance with DIN 53240-2.

In this method the sample is reacted with acetic anhydride in the presence of 4-dimethylaminopyridine as catalyst, the hydroxyl groups being acetylated. This produces one molecule of acetic acid per hydroxyl group, whereas the subsequent hydrolysis of the excess acetic anhydride yields two molecules of acetic acid. The consumption of acetic acid is determined by titrimetry from the difference between the main value and a blank value which is to be carried out in parallel.

The glass transition temperature $T_g$ is determined by means of DSC (differential scanning calorimetry) in accordance with DIN EN ISO 11357-1. The values reported are taken from a second heating cycle.

The molecular weight is determined by means of gel permeation chromatography (GPC).

The samples were characterized in tetrahydrofuran as eluent in accordance with DIN 55672-1.

$M_n$ (UV)=number-average molar weight (GPC, UV detection), figure in g/mol $M_w$ (UV)=mass-average molar weight (GPC, UV detection), figure in g/mol The polyester component employed preferably comprises copolyesters, more particularly copolyesters from a dicarboxylic and/or (poly-)carboxylic acid mixture and a dialcohol or (poly-)alcohol mixture.

The fraction of the polyester component in the preparation is 20% to 95% by weight, based on the preparation, more particularly 55% to 75% by weight. Specifically it is possible to use typical carboxylic acids and their esterifiable derivatives; that is, the acid component of the copolyester comprises, for example, phthalic acid, isophthalic acid, terephthalic acid, 1,2-, 1,3-, 1,4-cyclohexanedicarboxylic acid, succinic acid, adipic, azelaic, sebacic, undecanedioic, dodecanedioic, tetradecanedioic, octadecanedioic acid, methyltetra-, methylhexahydrophthalic acid, pyromellitic acid, dimer fatty acids, and/or trimellitic acid, their acid anhydrides and/or lower alkyl esters such as, for example, methyl esters, and also mixtures of these. Preference is given to using isophthalic acid, terephthalic acid, adipic acid, sebacic acid, 1,2-cyclohexanedicarboxylic acid, trimellitic acid, and their acid anhydrides and/or esterifiable derivatives.

Alcohol components of the copolyester that are used are, for example, ethylene glycol, 1,2- and/or 1,3-propanediol, diethylene, dipropylene, triethylene or tetraethylene glycol, 1,4-butanediol, 2,2'-butylethyl-1,3-propanediol, 2-methyl-1,3-propanediol, 1,5-pentane-diol, cyclohexanedimethanol, glycerol, 1,6-hexanediol, 2,2'-dimethyl-1,3-propanediol, trimethylolethane, tri-methylolpropane, 1,4-benzyldimethanol and -ethanol, 2,4-dimethyl-2-ethylhexane-1,3-diol, 1,2,6-hexanetriol, Dicidol and also mixtures of these. Preference is given to using 2-methyl-1,3-propanediol, 2,2'-dimethyl-1,3-propanediol, ethylene glycol and trimethylolpropane.

Likewise provided by the present invention are processes for producing the preparation of the invention. In the simplest embodiment the production process of the invention comprises mixing at least one oligomeric siloxane component and at least one polymer component, preferably a polyester component. The mixing of the components may take place at temperatures from 0 to 150° C., preferably at temperatures from 20 to 100° C. In a further embodiment the mixing may take place in the presence of a solvent. In this case the solvent may be selected from the group consisting of liquid aromatic hydrocarbons, alcohols, esters, glycols, glycol ethers and/or glycol esters encompassing butyl glycol, butyl glycol acetate, methoxypropanol, methoxypropyl acetate, methyldipropylene glycol, Dibasic Ester, xylene, Solvent Naphtha 100-200.

The solvent is added either separately, as an individual constituent, or in combination with one of the components according to the invention, more particularly with the polyester component. In the simplest case the polyester component is in solution in the solvent and is mixed with the above-described oligomeric siloxane component.

The mixing of the siloxane component and the polyester component takes place typically over a period of 0.3 to 10 hours.

The siloxane oligomer/polyester mixtures obtained in this way can be stable on storage for at least three months.

Likewise provided by the present invention is the use of a preparation according to the invention as a binder in a formulation. The formulations in question are preferably those for metal coatings, such as in can coating and coil coating, for example.

Besides the preparations of the invention, these formulations may also contain auxiliaries and additives, selected more particularly from further (latent) hydroxy-functional binders, optionally also with other functional groups containing active hydrogen atoms, such as polyesters, polyethers, polyacrylates, epoxy resins and/or crosslinkers such as blocked (poly)isocyanates, amino resins, epoxy resins and/or water and/or organic solvents and/or crosslinking catalysts, for example, pigments, fillers, matting agents, structuring agents, dispersing assistants, flow control assistants, light stabilizers, inhibitors, colour brighteners, photosensitizers, thixotropic agents, anti-skinning agents, defoamers, antistats, thickeners, thermoplastic additives, dyes, flame retardants, internal release agents, fillers and/or blowing agents.

Formulations, more particularly metal coatings, containing a preparation according to the invention are likewise provided by the present invention.

In the stated formulations the preparations according to the invention may be combined with all typical auxiliaries and additives. These may be present in the formulations at 0%-70% by weight.

In the stated formulations the silicon content is 0.1%-10% by weight, based on the formulations.

Even without further remarks it is assumed that a person skilled in the art will be able to utilize the above description to its widest extent. The preferred embodiments and examples are therefore to be interpreted merely as a descriptive disclosure which in no way has any limiting effect whatsoever. Below, the present invention is illustrated using examples. Alternative embodiments of the present invention are obtainable by analogy.

EXAMPLES

Example 1

Preparation of an Inorganic Siloxane Oligomer 10 g of Dynasylan GLYMO (glycidyloxypropyltrimethoxy-silane from Degussa GmbH) are admixed with 1.14 g of water (1.5 mol/mol Si) and 0.2 g of boric acid (Aldrich) and stirred at 70° C. for two hours. Subsequently the hydrolysis alcohol produced is removed in vacuo at 1 mbar and 70° C. This gives a colourless oligomer which is stable on storage for at least three months.

Example 2

Preparation of a Hydroxy-Functional Polyester

Isophthalic acid (400 g, 2.4 mol), terephthalic acid (328 g, 2.0 mol), 1,2-dihydroxyethane (105 g, 1.7 mol), 2,2'-dimethyl-1,3-dihydroxypropane (177 g, 1.7 mol) and 1,6-hexanediol (172 g, 1.5 mol) are melted in a stream of nitrogen in a 2 l flask with top-mounted distillation unit. When a temperature of 160° C. is reached, water begins to be distilled off. Over the course of one hour the temperature is raised gradually to 240° C. After a further hour at this temperature the elimination of water becomes slower. 50 mg of titanium tetrabutoxide are introduced with stirring, and operation continues in vacuo, which is adapted in the course of the reaction so that distillate is continually produced. When the desired hydroxyl and acid number range has been reached, the system is shut off. The hydroxyl number and the acid number are 20 mg KOH/g and 1.1 mg KOH/g respectively. The polyester is subsequently dissolved to a strength of 50% in Solvent Naphtha 150 (DHC Solvent Chemie GmbH)/butyl glycol (3:1).

Analytical Data
$M_n$=5800 (GPC)
$T_g$=33° C. (DSC)

Example 3

Preparation of a Hydroxy-Functional Polyester

From isophthalic acid (400 g, 2.4 mol), terephthalic acid (328 g, 2.0 mol), 1,2-dihydroxyethane (160 g, 2.4 mol) and 2,2'-dimethyl-1,3-dihydroxypropane (252 g, 2.4 mol), in the same way as in Example 2, a polyester is obtained, with a hydroxyl number of 20 mg KOH/g and an acid number of 1 mg KOH/g. The polyester is subsequently dissolved to a strength of 55% in Solvent Naphtha 150 (DHC Solvent Chemie GmbH)/methoxypropyl acetate/methoxypropanol (2:5:3).

Analytical Data
$M_n$=5100 (GPC)
$T_g$=54° C. (DSC)

Example 4

Production of an Inventive Preparation 51 g of the siloxane oligomer from Example 1 are introduced with stirring into 300 g of polyester solution from Example 2. The resulting binder solution is clear and stable on storage for at least 3 months.

Example 5

Production of an Inventive Preparation 42 g of the siloxane oligomer from Example 1 are introduced with stirring into 300 g of polyester solution from Example 3. The resulting binder solution is clear and stable on storage for at least 3 months.

TABLE 1

| Coating formulations A | | | | | | | | |
|---|---|---|---|---|---|---|---|---|
| | L1 | V1 | L2 | V2 | L3 | V3 | L4 | V4 |
| Binder Example 4 | 68.3 | — | — | — | 60 | | | |
| Polyester solution Example 2 | — | 69.4 | — | — | | 60 | | |
| Binder Example 5 | — | — | 72.1 | — | | | 60 | |
| Polyester solution Example 3 | — | — | — | 73.3 | | | | 60 |
| AEROSIL 200[1] | | | | | 0.3 | 0.3 | 0.3 | 0.3 |
| Cymel 303 LF[2] | 9.1 | 9.0 | 11.1 | 11.3 | 6.2 | 6.2 | 6.2 | 6.2 |
| Nacure 5925[3] | 0.7 | 0.7 | 0.7 | 0.7 | | | | |
| DYNAPOL 1203[4] | | | | | 1.0 | 1.0 | 1.0 | 1.0 |
| Disparlon 1984/ 50% in Hydrosol A200 ND[5] | | | | | 0.3 | 0.3 | 0.3 | 0.3 |
| Hydrosol A200 ND[5] | 6.8 | 6.9 | 7.2 | 7.3 | 10.0 | 10.0 | 10.0 | 10.0 |
| Butyl diglycol | 15.1 | 13.9 | 8.9 | 7.3 | | | | |
| Dibasic ester[6] | | | | | 10.7 | 10.7 | 10.7 | 10.7 |

[1] fumed silica having a specific surface area of 200 m$^2$/g, e.g. product from Degussa GmbH
[2] melamine resin (hexamethoxymethylmelamine (HMMM)): e.g. product from Cytec Industries
[3] dodecylbenzylsulphonic acid/isopropanol (blocked acidic catalyst), e.g. product from King Industries Inc.
[4] covalently blocked catalyst based on sulphonic acid, e.g. product from Degussa GmbH
[5] liquid aromatics mixture, napthalene-free, e.g. product from ExxonMobil Chemical o.e.
[6] solvent mixture based on dimethyl esters of succinic, pentanedioic and adipic acids, e.g. product from Invista Assessment of the Coatings Coating materials L1, V1, L2 and V2 are applied at approximately 5 to 7 g/m$^2$ (dry film weight) to tinplate and baked at 205° C. (PMT=peak metal temperature) for 5 min (oven residence time). Crosslinking is checked for completeness using methyl ethyl ketone (MEK), also familiar to the expert under the term "MEK double rubs" (ECCA test method T11). The flexibility is determined in accordance with DIN EN 13523-7:2001 (T-bend testing). The pencil hardness is determined in accordance with DIN EN 13523-4:2001.

As a further test, the coated metal sheets are shaped with a punch into square-section cans. These cans are sterilized in water at 129° C. for 30 minutes. Following sterilization, the coating is assessed for adhesion and surface quality at the four different corners.

TABLE 2

Results of coating material testing

|  | L1 | V1 | L2 | V2 |
|---|---|---|---|---|
| MEK test [DR] | >100 | 36 | >100 | >100 |
| 0T adhesion C/L* | 0/0 | 4/2 | 0/0 | 3/3 |
| Pencil hardness | 2H | H | H | F |
| Adhesion after sterilization** | 1/1 | 0/0 | 1/1 | 0/0 |

*C: cracking, L: loss of adhesion; 0 = no cracking/loss of adhesion, 4 = much cracking/loss of adhesion
**1 = very good adhesion, 4 = very poor adhesion, 0 = complete delamination Coating materials L3, V3, L4 and V4 are applied at about 5 μm (dry film thickness) to unpretreated, hot dipped galvanized steel and baked at 224° C. (PMT=peak metal temperature) for 45 s (oven residence time). Subsequently a topcoat material (for formulation see Table 3) is applied at 20 μm (dry film thickness) and baked at 232° C. (PMT) for 46 s (oven residence time). Crosslinking is checked for completeness using methyl ethyl ketone (MEK), also familiar to the expert under the term "MEK double rubs" (ECCA test method T11). The flexibility is determined in accordance with DIN EN 13523-7:2001 (T-bend testing). The pencil hardness is determined in accordance with DIN EN 13523-4:2001. The corrosion resistance of the coating is determined in accordance with DIN EN ISO 4628 1-10.

TABLE 3

Formulation of topcoat material

|  | Topcoat material |
|---|---|
| DYNAPOL 830-02[1] | 20.5 |
| DYNAPOL 838-02[1] | 21.5 |
| TiO$_2$[2] | 29.1 |
| Cymel 303[3] | 5.5 |
| Nacure 2500[4] | 0.4 |
| Acematt OK 500[5] | 3.6 |
| Dibasic ester[6] | 9.0 |
| BYK 350[7] | 0.5 |
| Hydrosol A200 ND[8] | 9.9 |

[1]commercially available solutions of linear or branched polyester or copolyester binders, e.g. product from Degussa GmbH, can also be other binders suitable for topcoat formulations of this kind
[2]white pigment
[3]melamine resin (hexamethoxymethylmelamine (HMMM)): e.g. product from Cytec Industries
[4]p-toluenesulphonic acid/isopropanol, e.g. product from King Industries Inc. or Worlee Chemie GmbH
[5]matting agent, e.g. from Degussa GmbH
[6]solvent mixture based on the dimethyl esters of succinic, pentanedioic and adipic acids, e.g. product from Invista
[7]flow control assistant, e.g. product from BYK Chemie
[8]liquid aromatics mixture, naphthalene-free, e.g. product from ExxonMobil Chemical o.e.

TABLE 4

Results of coating material testing

|  | L3 | V3 | L4 | V4 |
|---|---|---|---|---|
| MEK test [DR] | 100 | 70 | 100 | 100 |
| 0T adhesion C/L* | 0/0 | 2/2 | 0/0 | 1/2 |
| Pencil hardness | HB | HB | HB | HB |
| Salt spray test T 3.0 bending after 750 h | OK | severe detachment | OK | severe detachment |

*C: cracking, L: loss of adhesion; 0 = no cracking/loss of adhesion, 4 = much cracking/loss of adhesion

The invention claimed is:
1. A preparation, comprising:
    at least one oligomeric siloxane component, and
    at least one polymer component,
    wherein the oligomeric siloxane component is obtained by controlled hydrolysis and condensation, in the presence of boric acid, of at least one epoxy-functional silane of the general formula I

    R$^1$—SiR'$_m$(OR)$_{3-m}$    (I)

in which R$^1$ is a group

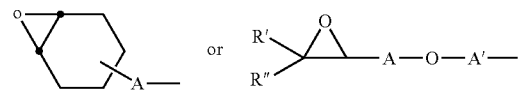

and the groups R, R' and R" are the same or different and are each a hydrogen (H) or a linear, branched or cyclic, optionally substituted alkyl group having 1 to 6C atoms, groups A and A' are the same or different and are each a divalent alkyl group having 1 to 10C atoms, and m is 0 or 1, and
    wherein the polymer component is a hydroxyl-containing polymer selected from the group consisting of polyesters and polycarbonate polyols.
2. The preparation according to claim 1, wherein at least one further organofunctional silane is present additionally during the hydrolysis and condensation, wherein said at least one further organofunctional silane has the general formula II

    R$^2$—SiR'$_n$(OR)$_{3-n}$    (II)

in which R$^2$ is a linear, branched or cyclic, optionally substituted alkyl group having 1 to 20C atoms, R' is methyl, groups R independently are a hydrogen or a linear, branched or cyclic alkyl group having 1 to 6C atoms and n is 0 or 1.
3. The preparation according to claim 1, wherein 0.001 to ≦5 mol of water are used per mole of alkoxy function of the silane employed, no further hydrolysis and condensation catalyst besides boric acid as hydrolysis catalyst and condensation component is used, and the condensates formed in the reaction are based on Si—O—B and/or Si—O—Si bonds.
4. The preparation according to claim 1, wherein 0.1 to 2 mol of water are used in the reaction per mole of alkoxy function of the silane employed.
5. The preparation according to claim 1, wherein 0.001 to 1 mol of boron is used per mole of silane employed.
6. The preparation according to claim 1, wherein the reaction is carried out at a temperature in the range from 0 to 200° C.
7. The preparation according to claim 1, wherein the polyester has an acid number between 0 and 10 mg KOH/g, a hydroxyl number between 3 and 200 mg KOH/g, a glass transition temperature (T$_g$) between −50° C. and +110° C., a linear or branched structure, and a molecular weight (M$_n$) between 800 and 25 000.
8. The preparation according to claim 1, wherein the fraction of the polymer component in the preparation is 20%-95% by weight, based on the preparation.
9. The preparation according to claim 1, wherein the epoxy-functional silane of the general formula I is glycidyloxypropyltrimethoxysilane or glycidyloxypropyltriethoxysilane.

10. A process for producing a preparation according to claim 1, comprising mixing at least one oligomeric siloxane component and at least one polymer component.

11. The process according to claim 10, wherein the mixing takes place at temperatures from 0 to 150° C.

12. The process according to claim 10, wherein the mixing takes place in the presence of a solvent.

13. A formulation, comprising:

the preparation according to claim 1 as a binder.

14. The formulation according to claim 13, which is a metal coating.

* * * * *